US011099059B2

(12) United States Patent
Frey et al.

(10) Patent No.: US 11,099,059 B2
(45) Date of Patent: Aug. 24, 2021

(54) INTELLIGENT NOISE MAPPING IN BUILDINGS

(71) Applicant: Siemens Schweiz AG, Zurich (CH)

(72) Inventors: Christian Frey, Unterägeri (CH); Job Kamphuis, Zurich (CH); Marjut Rautavaara, Neuheim (CH); Dominique Vanhoutte, Zug (CH)

(73) Assignee: SIEMENS SCHWEIZ AG, Zurich (CH)

( * ) Notice: Subject to any disclaimer, the term of this patent is extended or adjusted under 35 U.S.C. 154(b) by 104 days.

(21) Appl. No.: 16/476,708

(22) PCT Filed: Jul. 17, 2017

(86) PCT No.: PCT/EP2017/068053
§ 371 (c)(1),
(2) Date: Jul. 9, 2019

(87) PCT Pub. No.: WO2018/130314
PCT Pub. Date: Jul. 19, 2018

(65) Prior Publication Data
US 2019/0376838 A1 Dec. 12, 2019

(30) Foreign Application Priority Data

Jan. 12, 2017 (EP) ..................... 17151263

(51) Int. Cl.
*G01H 3/12* (2006.01)
*H04W 4/029* (2018.01)
*H04M 1/72406* (2021.01)

(52) U.S. Cl.
CPC ........ *G01H 3/125* (2013.01); *H04M 1/72406* (2021.01); *H04W 4/029* (2018.02)

(58) Field of Classification Search
CPC ............ G01H 3/125; G01H 3/00; G01H 5/00; G01H 3/14; G01H 9/00; H04W 4/029;
(Continued)

(56) References Cited

U.S. PATENT DOCUMENTS

| 2007/0042716 A1* | 2/2007 | Goodall | ................ H04W 16/18 455/67.11 |
| 2013/0039497 A1* | 2/2013 | Ramalho | ............... H04R 1/2834 381/56 |

(Continued)

OTHER PUBLICATIONS

Search Report for International Application No. PCT/EP2017/068053, 3 pages, dated Sep. 18, 2017.

*Primary Examiner* — Nimesh Patel
(74) *Attorney, Agent, or Firm* — Slayden Grubert Beard PLLC (57) ABSTRACT

A method and a system for noise mapping in buildings, wherein a communication device is configured for determining the current noise level of a location in the building by an appropriate sensor of the communication device, wherein the communication device is further configured to communicate the noise level information and the location data to a computer system; wherein the computer system is configured for collecting and analyzing the received noise level information and the corresponding location data, and wherein the computer system is further configured to provide a noise heat map of the building.

13 Claims, 4 Drawing Sheets

(58) Field of Classification Search
CPC ....... H04W 4/02; H04W 36/30; H04W 4/021; H04W 4/40; H04W 48/16; H04W 4/023; H04W 16/18; H04W 24/06; H04W 24/08; H04W 4/30; H04W 52/241; H04W 52/245; H04W 92/16; H04M 1/72525; G06T 15/205; G06T 2207/10024; G06T 17/00; G06T 19/006; G06T 2200/04; G06T 2207/20084; G06T 17/05; H04B 17/309; H04B 17/345; H04B 17/21; H04B 1/715; H04B 17/27; H04B 17/336; H04B 1/1027; H04B 1/71632; H04B 1/71637; H04B 1/7176; H04B 1/719; H04B 3/46; H04B 7/0626; H04B 17/318; H04B 10/07953; Y10S 901/01; Y10S 901/46; G01T 1/161; G01T 1/1642; G01T 1/1603; G01T 1/1611; G01T 1/1635; G01T 1/1644; G01T 1/1615; G01T 1/1647; G01T 1/1648; G01T 1/2985; G08B 21/182; G08B 13/1672; G08B 21/02; G08B 25/08; G08B 23/00; G08B 13/19604; G08B 13/19673; H04R 25/505; H04R 3/005; H04R 1/1083; H04R 2203/12; H04R 29/00; H04R 29/008; H04R 2225/43; H04R 25/305; H04R 25/554; H04R 2225/41; H04R 25/50; H04R 3/02; G01S 3/803; G01S 3/8032; G01S 5/021; G01S 5/0215; G01S 5/0236; G01S 5/0252; G01S 5/0273; G01S 5/18; G01S 7/539; G01S 17/89; G01S 7/5205; G01S 7/52077; G01S 5/0294

See application file for complete search history.

(56) References Cited

U.S. PATENT DOCUMENTS

| | | | |
|---|---|---|---|
| 2013/0329863 A1* | 12/2013 | Bentley | G08B 23/00 379/32.01 |
| 2015/0110276 A1 | 4/2015 | Gereb | H04R 29/008 |
| 2015/0223000 A1 | 8/2015 | Bran | H04R 29/00 |
| 2015/0287421 A1 | 10/2015 | Benway | G10L 21/0208 |
| 2015/0312689 A1* | 10/2015 | Eckl | H04R 29/00 381/57 |

* cited by examiner

INTELLIGENT NOISE MAPPING IN BUILDINGS

CROSS-REFERENCE TO RELATED APPLICATIONS

This application is a U.S. National Stage Application of International Application No. PCT/EP2017/068053 filed Jul. 17, 2017, which designates the United States of America, and claims priority to EP Application No. 17151263.5 filed Jan. 12, 2017, the contents of which are hereby incorporated by reference in their entirety.

TECHNICAL FIELD

The present disclosure relates to building management. Various embodiments include systems and methods to provide comfort in buildings, especially office buildings.

BACKGROUND

Noise has a big influence on the comfort and health of persons. Unnecessary noise is the most common problem in large office space and influences working results but also workers health. Understanding the basics of sound transmission and measurement is essential to a realistic assessment of a facility's sound environment. Recent findings in the field of cognitive science show that mental activities requiring a lot of working memory, such as paying attention to a variety of different information or performing a complex analysis, are especially noise-sensitive. The frequent interruptions and distractions noise causes often result in work errors or slow done jobs to be done due to loss of concentration. In addition, this causes stress and may lead to exhaustion, burnouts, depression, and irritability expressed at home.

Walls are still the first line of defense in acoustic design. Physical barriers (cubicles) in a large office space will block sound movement fairly effectively if they are of the proper height and constructed of sound-absorbing materials. Workers in a large office environment may work from home office or book (large) meeting rooms for several hours to do their brainwork. On the other hand, workers might search for quiet zones or have to raise their voice to their colleagues and ask for quietness. This is very inefficient if done day by day.

In response to numerous requests for quiet study space and recognizing that different noise levels are suitable for different activities, a library has implemented the policy of dividing the area of the library in different quiet zones: For instance "Silent Study Rooms", "Quiet Study", and "Group Study Rooms". Library staff will politely inform noisy patrons of the library's quiet policy and enforcement measures, if warnings are disesteemed.

A known technical method for controlling noise involves adding sound to the environment. Sound-masking systems work to reduce the distance over which speech and other distracting sounds can be heard by raising the decibel level of the "noise floor" in a controlled fashion. A series of speakers installed in the ceiling distributes electronically generated background sound that serves to cover or reduce the impact of noise spikes. This specially engineered sound creates an ambient environment that is perceived to be quieter and that enhances speech privacy in healthcare facilities. This is causing costs regarding infrastructure and technical equipment to implement this method.

SUMMARY

The teachings of the present disclosure describe noise measurement and feedback systems to make aware of and/or minimize the above mentioned problems. For example, some embodiments include a method for noise mapping in a building, the method comprising: determining the current noise level of a location in the building by a communication device, especially a mobile communication device; communicating the noise level information and the location data from the communication device to a computer system; and collecting and analyzing the noise level information and the location data by the computer system and providing a noise heat map of the building.

As another example, some embodiments include a system for noise mapping in a building, the system comprising: a communication device, especially a mobile communication device, configured for determining the current noise level of a location in the building by an appropriate sensor of the communication device; wherein the communication device is configured to communicate the noise level information and the location data to a computer system; and a computer system for collecting and analyzing the received noise level information and the corresponding location data; wherein the computer system is configured to provide a noise heat map of the building.

As another example, some embodiments include a communication device, e.g. a mobile communication device, configured for determining the current noise level of a location in a building by an appropriate sensor; wherein the communication device is further configured to communicate the noise level information and the location data to a computer system.

The methods or the systems for noise mapping can be applied for one building, for more buildings, or for a part of a building (e.g. a floor).

BRIEF DESCRIPTION OF THE DRAWINGS

The above-mentioned and other concepts of the present disclosure are described below with reference to the drawings of the various embodiments. The shown embodiments are intended to illustrate, but not to limit the scope of the disclosure. The drawings contain the following figures, in which like numbers refer to like parts throughout the description and drawings and wherein.

DETAILED DESCRIPTION

The first step in reducing noise in building environments is identifying its sources and presenting the current noise level. A digital decibel meter is an effective tool for measuring the sound levels of specific areas of the building at different times of day. These days Smartphone Apps are able to do this measurement. In some embodiments, office workers (many as possible, at best all) opt in via a Building Noise App and get immediate feedback on the noise level in their direct environment (see e.g. FIG. 2). In some embodiments, they choose a level of maximum environmental noise (e.g. 44 dB, 72 dB, 87 dB) they would like to have or are willing to accept. If set maximum noise level is exceeded, feedback may be given by the Smartphone App (visual by blinking display or vibration). In some embodiments, the Building Noise App is connected to a dedicated cloud solution or even to a building cloud solution that creates shares and manages all of a building's data.

The noise or sound can be measured or determined by a sound level meter. A sound level meter can be realized as a mobile hand-held device comprising a microphone which gathers the sound waves and the corresponding changes of the air pressure. Mobile communication devices (e.g. smartphones) can be equipped with a sound level meter or can be used as a sound level meter. Typically, mobile communication devices (e.g. smartphones) comprise a microphone. With adequate software (e.g. an App) a mobile communication device can be easily used as a sound level meter.

In some embodiments, the level of maximum environmental noise predefines an area of maximum noise level on the floor by the office manager or the first user's profile detected in this area and is shown on a floor map on the Building Noise App. In addition, the measured noise level is shown as an overlay, for instance as a noise heat map (see e.g. FIG. 3). With smartphones (the more the better, at best all) running the App and are connected to the cloud, coworkers can choose the area of maximum noise they would like to do their work.

Noise pollution or noise disturbance is no longer regarded just to be a nuisance. Nowadays noise pollution or noise disturbance is regarded as an environmental or work space problem, which is not only impairing the ability of a person to focus on a work assignment, but furthermore can causing health problems to persons. At work, a person can be exposed to industrial noise and/or to office noise. Depending on the sound frequency noise levels of about 110 dB can cause pain to persons.

The noise perception or the noise sense is subjective to people. Therefore, there is no objective threshold of the noise level which, when exceeded impairs the ability of a person to focus on a work assignment. Depending on the sound frequency noise levels as of about 50 to 60 dB can impair the ability of a person to focus on a work assignment. But this threshold can be different for different people and the threshold can change depending on the age or the constitution of the people.

No additional hardware like microphones has to be installed to implement the teachings herein. No wiring is needed. This is a big cost saving. Users are less concerned about monitoring and privacy as they opt in to take advantage of quiet working. The monitoring is done by the App (software program) and no co-worker has to act as guardian and might therefore be disliked by the noise makers. In addition, anonymous feedback can be given by a "QUIET PLEASE" button on the App. The cloud solution allows a crowd sourced measurement by all Smartphone's connected (Microphone Array) to represent a detailed noise heat map. Thus, it leads workers to their preferred areas of noise level as the floor noise level is represented dynamically as noise heat map on the App.

Figure 1:
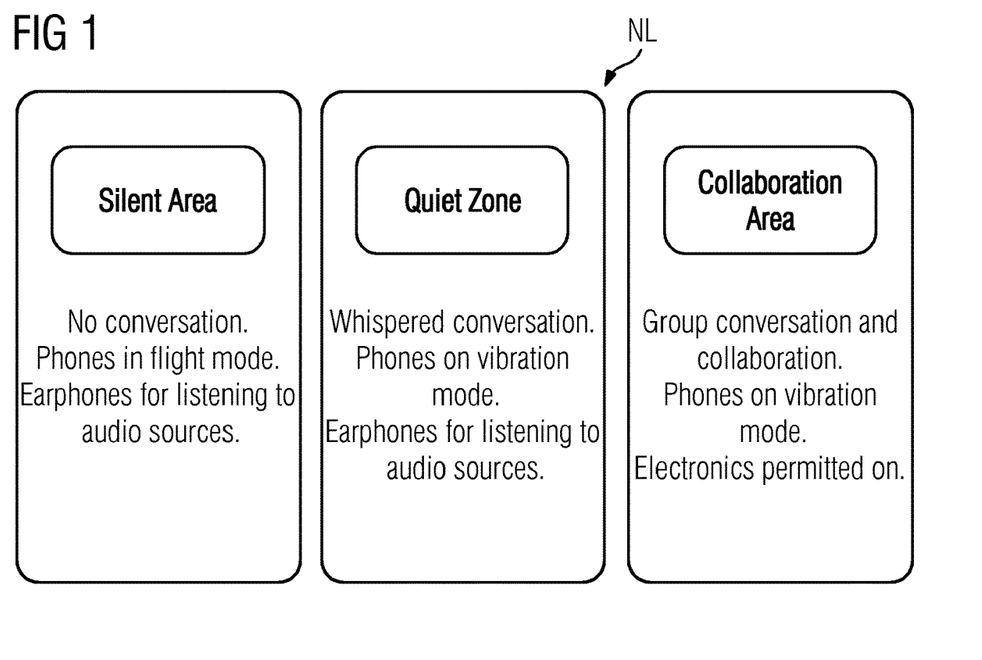
FIG. 1 illustrates the classification of three different noise levels in corresponding quiet zones.

FIG. 1 illustrates the classification of three different noise levels (NL) in corresponding quiet zones. In response to numerous requests for quiet study space and recognizing that different noise levels are suitable for different activities, a library has implemented the exemplary policy illustrated in FIG. 1 and provided three quiet zones for visitors of the library:

"Silent Area" (e.g. no conversation, mobile phones in flight mode);
"Quiet Zone" (e.g. whispered conversation, mobile phones in vibration mode); and
"Collaboration Area" (e.g. for group conversation and collaboration).

The library staff will remind noisy visitors to obey the policy. Otherwise the library staff will invite noisy visitors to leave the library.

Figure 2:
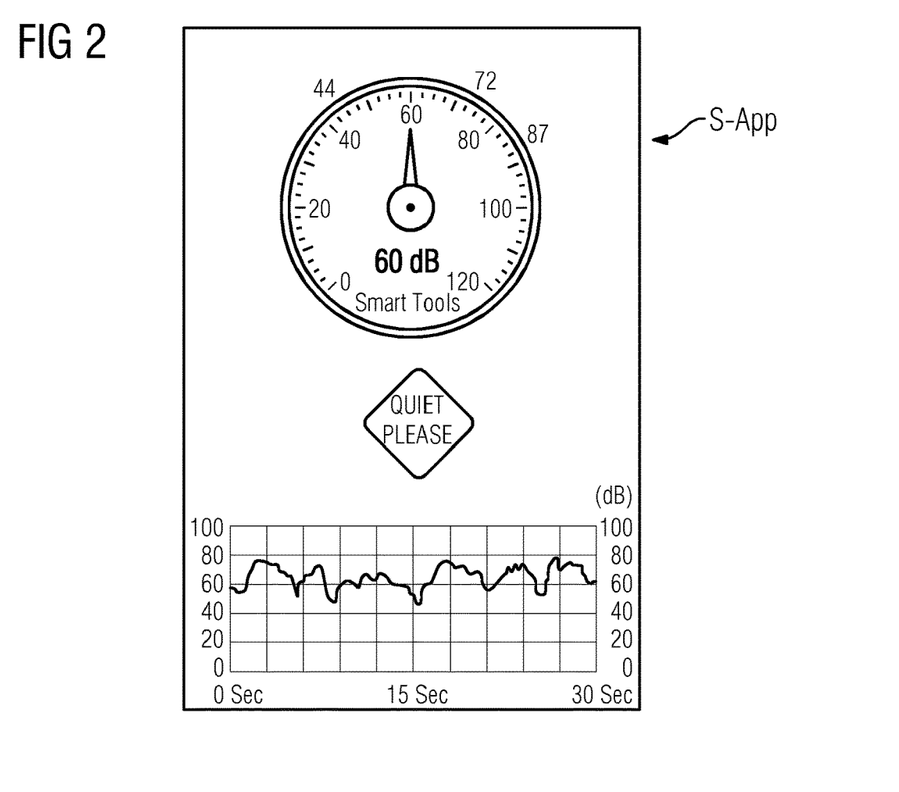
FIG. 2 illustrates an exemplary App (software program) on a communication device for measuring the sound.

FIG. 2 shows an exemplary user interface of an exemplary App (Building Noise App) S-App (software program) for measuring the sound (or noise). The App S-App is installed on a mobile communication device (e.g. a smartphone). Mobile communication devices (e.g. smartphones, tablet-computers) can be equipped with a sound level meter or can be used as a sound level meter since all mobile communication devices (e.g. smartphones) comprise a microphone. With adequate software (e.g. an App) a mobile communication device can be easily used as a sound level meter. Furthermore, mobile communication devices (e.g. smartphones, tablet-computers) comprise communication means (e.g. radio, WLAN, Bluetooth, satellite communication, GMS) to communicate with other mobile communication devices or to communicate with a server computer or with a data base server or with a cloud.

An important step in reducing noise in building environments is identifying its sources and presenting the current noise level. A digital decibel meter (e.g. a sound level meter) is an effective tool for measuring the sound levels of specific areas of the building at different times of day. These days Smartphone Apps are able to do this measurement.

Figure 3:
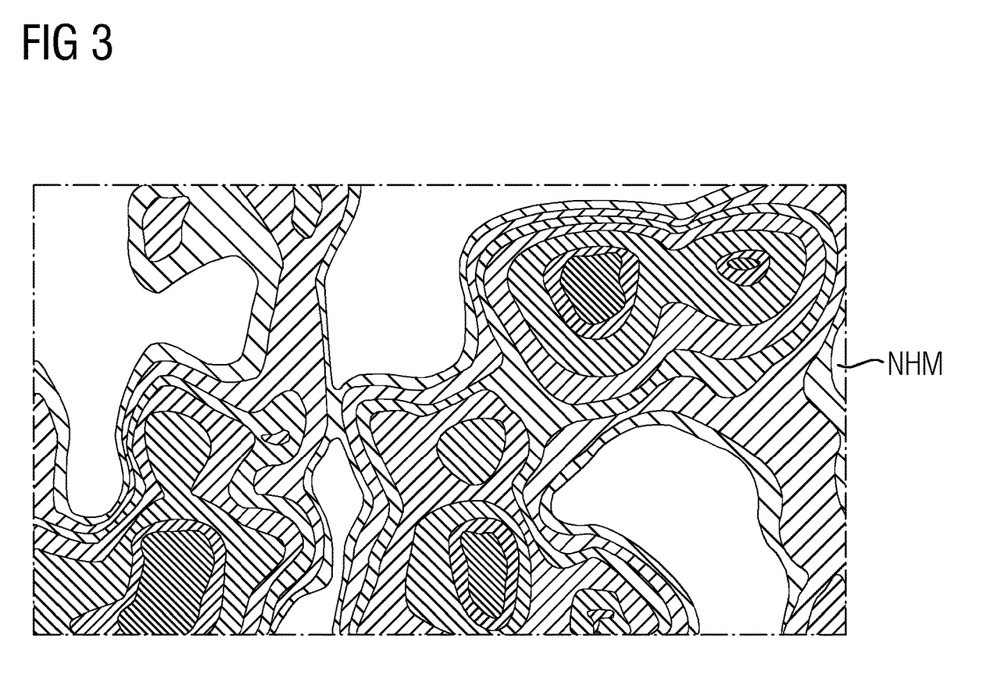
FIG. 3 illustrates an exemplary acoustic holography used to map building noise on a floor.

FIG. 3 shows an exemplary acoustic holography used to map building noise on a floor. The measured noise level is shown as an overlay e.g. as a noise heat map NHM. Users (e.g. workers) with Smartphones running the respective App are connected to the cloud (e.g. a remote server providing the necessary data processing to provide the current noise heat map NHM in the respective building) can choose the area of maximum noise they would like.

In some embodiments, a significant number of office workers opt in via a Building Noise App S-App (see FIG. 2) and get immediate feedback on the noise level in their direct environment. In addition, they may be allowed and/or prompted to choose a level of maximum environmental noise (e.g. 44 dB, 72 dB, 87 dB) they would like to have or are willing to accept. If set maximum noise level is exceeded, feedback is given by the Smartphone App (visual by blinking display or vibration). The Building Noise App S-App (see FIG. 2) is connected to a dedicated cloud solution or even to a building cloud solution that creates, shares, and manages all of a building's data.

The level of maximum environmental noise predefines an area of maximum noise level on the floor by the office manager or the first user's profile detected in this area and is shown on a floor map on the Building Noise App S-App (see FIG. 2). In addition, the measured noise level is shown as an overlay. With all Smartphone running the Building Noise App S-App (see FIG. 2) and are connected to the cloud, co-workers can choose the area of maximum noise they would like to do their work.

Figure 4:
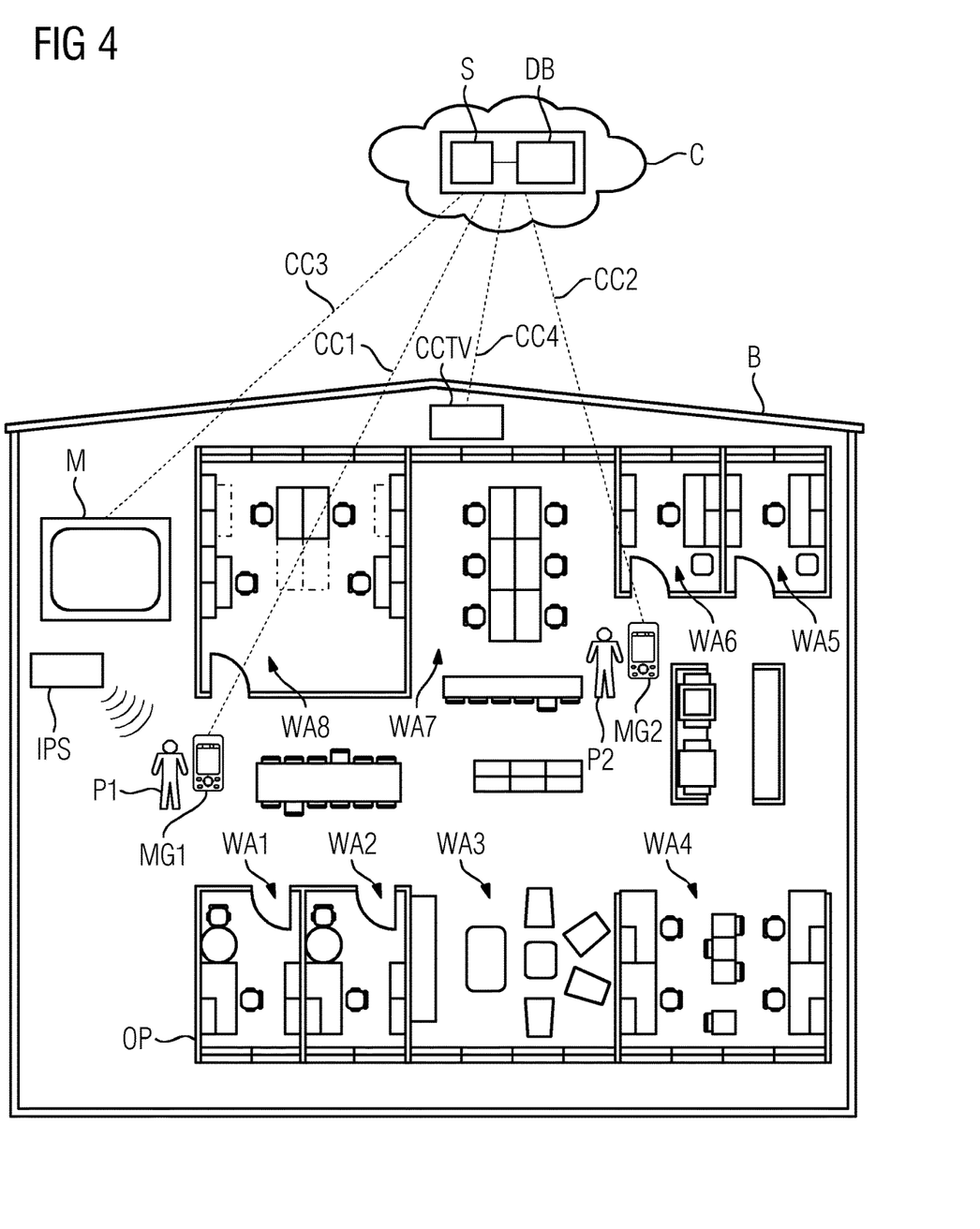
FIG. 4 illustrates an exemplary system for noise mapping in one or more buildings.

FIG. 4 illustrates an exemplary system for noise mapping in one or more buildings B. The exemplary system comprising: a communication device (e.g. mobile communication device, smart phone, laptop, tablet computer) MG1, MG2 configured for determining the current noise level of a location WA1-WA8 in the building B by an appropriate sensor (e.g. a digital decibel meter or a sound level meter) of the communication device; wherein the communication device MG1, MG2 is configured to communicate the noise level information and the location data to a computer system S; a computer system S for collecting and analyzing the received noise level information and the corresponding location data; wherein the computer system is configured to provide a noise heat map of the building. In some embodiments, the computer system S (e.g. a server computer, for instance an adequate personal computer or a workstation) comprising communication means (e.g. radio, WLAN, Internet), input/output means (e.g. keyboard, mouse, monitor), adequate processing means (one or more processing units), and memory (e.g. RAM, drives, flash memory, data base DB). In some embodiments, the computer system S comprises a cloud computing infrastructure, e.g. as SaaS (Software as a Service) or as IaaS (Infrastructure as a Service).

As communication device MG1, MG2 for determining the current noise level of a location WA1-WA8 in the building B can in principle be used any device (e.g. mobile communication devices such as smart phones, laptops, tablet computers, but also desktop computers, or networked devices) in the building having an appropriate sensor (e.g. a digital decibel meter or a sound level meter). In the sense of the underlying invention all devices in the building can be used as "noise detection units", which have a microphone and noise level measurement equipment.

The noise heat map can be provided for and/or published on every communication device MG1, MG2 (e.g. mobile communication devices such as smart phones, laptops, tablet computers, but also desktop computers, or networked devices) which are used as "noise detection units". The noise heat map can also be provided for and/or published on web-based platforms (e.g. Intranet—Extranet—Internet) for broad distribution or consultation by any user of the building. The web-based platform can be accessed by an appropriate URA link.

In some embodiments, the computer system S stores the received noise level information and the corresponding location data in the storage unit DB (e.g. an appropriate data base). These data can be stored for historical reasons as log data, e.g. for long term evaluations or reports. The stored noise level information or data and the corresponding location data can also be used for analytics over longer time to be able to suggest and/or perform improvements to the building use, setup, office equipment and installation of sound reduction materials. The computer system S can comprise e.g. a rule-based engine to perform analytics based on the stored noise level information or data. For instance, the storage unit DB can be implemented as a relational data base or an in-memory data base.

A user P1, P2 can give feedback regarding the provided noise heat map to the computer system S via the communication connections CC1, CC2. The feedback can comprise information regarding the satisfaction of a user, quality, and/or accuracy of the provided noise heat map. The feedback can be used by the computer system S to improve the quality of the noise analysis and the quality of the provided noise map.

In some embodiments, analyzing the received noise level information and the corresponding location data by the computer system comprises analyzing and taken into account the source of the noise (e.g. human voices from inside or outside the building, outside traffic, gardening, and technical equipment like printers, motors or turbines). For identifying the source of a noise for instance an existing CCTV system (e.g. a camera/video system to monitor the building) in a respective building B can be used, which is connected to the computer system S via communication connection CC4 (e.g. an installation bus or a wireless connection). The computer system S can use the video or camera data provided by the CCTV system (closed-circuit television) to identify possible sources of noise by using appropriate analytics software, e.g. based on Markov models. For identifying the source of a noise also an existing and configured PBX system (Private Branch Exchange system), which is connected to the computer system S, can be used. For instance, in the US Pat. U.S. Pat. No. 8,918,343B2 a sound/noise identification system is disclosed. The US Pat. U.S. Pat. No. 8,918,343B2 is incorporated by reference in this application.

In some embodiments, the noise heat map of the building B is illustrated in reference to a preset maximum noise level heat map on the display of the communication device MG1, MG2 (e.g. mobile communication devices such as smart phones, laptops, tablet computers, but also desktop computers, or networked devices) or on a monitor M in the building B, or on a web-based platform. In case of a temporarily increased noise level, a message may be sent in order to inform a supervisor or people in the mapped reference area. This is e.g. for a supervisor controlling the noise levels in the zones. A reference noise map with highest noise levels allowed is defined. As long the measured noise level is below the reference, all is green and fine. If the noise level is for more than a preset time (e.g. 15 sec) above the preset noise level, an alarm will appear and is send to a supervisor or may trigger an indicator to inform people in this area to be more quiet.

In some embodiments, the noise heat map of the building B is updated by the computer system S based on the received noise level information in the locations WA1 to WA8. The locations WA1 to WA8 are in each case spaces or areas (e.g. e.g. meeting room, office area, communication area) in the one or more buildings B.

In some embodiments, the system further comprises a display M (e.g. monitor), wherein the noise heat map NHM (see FIG. 3) of the one or more buildings B is illustrated on the display M. (The display can be located at or within the building B (e.g. at the entrance, in the lobby, or entry area of the building B)).

In some embodiments, the noise heat map NHM (see FIG. 3) of the one or more buildings B is illustrated on the display of the communication device MG1, MG2 (e.g. mobile communication device, smart phone) of a user P1, P2 (e.g. workers in the building B).

In some embodiments, the noise heat map NHM (see FIG. 3) of the building respectively of the buildings B is illustrated on the display of the communication device MG1, MG2 (e.g. mobile communication device, smart phone) on demand of a user P1, P2. If a user P1, P2 can no longer bear the exposed the currently exposed noise level, the user can look for another place based on the currently valid noise heat map NHM (see FIG. 3) of the building. In some embodiments, the currently valid noise heat map NHM (see FIG. 3) is provided to the user P1, P2 in real time.

In some embodiments, the presentation of the noise heat map NHM (see FIG. 3) of the building is automatically updated on the display of the communication device (e.g. mobile communication device, smart phone).

In some embodiments, the presentation of the noise heat map NHM (see FIG. 3) of the building B is automatically updated, when the computer system S receives a new noise level information. When the noise level changes in one or more locations WA1-WA8 the noise heat map NHM of the building B is automatically updated. In some embodiments, the updated noise heat map NHM (see FIG. 3) is automatically provided on the mobile communication device MG1, MG2 of the user P1, P2.

In some embodiments, the presentation of the noise heat map NHM (see FIG. 3) of the building B is automatically updated according to a defined time frame (e.g. every 10 minutes). Advantageously the updated noise heat map NHM (see FIG. 3) is automatically provided on the mobile communication device MG1, MG2 of the user P1, P2.

In some embodiments, based on the noise heat map NHM (see FIG. 3) and based on noise comfort parameters for users, a space allocation (e.g. reservation of a room or a work place) for a respective user P1, P2 is automatically performed. In some embodiments, the space allocation information (e.g. a reserved room) for a respective user P1, P2 is provided on the mobile communication device MG1, MG2 when the respective user P1, P2 is approaching the building B or when the respective user P1, P2 is in a defined area of the building B (e.g. the entrance, the lobby, waiting area for elevators). The location of a user P1, P2 can be determined by a positioning system (e.g. GPS), e.g. by an Indoor Positioning System (IPS), e.g. Bluetooth low energy (BLE). The positioning system IPS communicates the position of users P1, P2 to the server S. In some embodiments, the space allocation information (e.g. a reserved room) is communicated as late as possible to a user P1, P2 so that the current situation is taken into regard by providing the space allocation information.

The illustration according to FIG. 4 shows an exemplary building

B comprising locations WA1 to WA8. A location WA1 to WA8 can be for instance a room, an area in the building, an office space, a work space, and/or a recreation area (e.g. a coffee stop). Locations WA1 to WA8 assigned to one or more buildings. In the illustration according to FIG. 4 the locations WA1 to WA8 are part of an office plan OP (e.g. on a floor).

Users P1, P2 (e.g. workers, employees) have in each case a communication device MG1, MG2 (e.g. mobile communication device, smart phone, laptop, tablet computer). The communication device MG1, MG2 is configured for determining the current noise level of a respective location WA1-WA8 in the building B by an appropriate sensor (e.g. a digital decibel meter or a sound level meter). The communication device MG1, MG2 is further configured to communicate the noise level information (e.g. volume of noise in/of the respective location WA1-WA8) and the location data (position of the location in the building or in an office plan OP to a computer system S. The computer system S is configured to collect and to analyze the received noise level information and the corresponding location data. The computer system S is further configured to provide a noise heat map NHM (see FIG. 3) of the building B. Advantageously the computer system S is further configured to provide the noise heat map NHM (see FIG. 3) of the building B or of an office plan OP or of a respective floor plan on a mobile communication device MG1, MG2 of an user P1, P2.

By using a positioning system, e.g. an Indoor Positioning System (IPS) the position of a mobile communication device MG1, MG2 can be determined. The determined position of a mobile communication device MG1, MG2 can be assigned to a sound or noise level. Noise level and respective position are communicated via communication connections CC1, CC2 (advantageously wireless communication connections (e.g. radio, WLAN) to the server S. The server S comprises hardware and software to provide a Noise Heat Map NHM (see FIG. 3). The Noise Heat Map NHM is provided to the mobile communication device MG1, MG2 via the communication connections CC1, CC2. On the display of the mobile communication device MG1, MG2 the Noise Heat Map NHM can be presented for a user P1, P2. The Noise Heat Map NHM can also or further be shown on a monitor M. In some embodiments, the monitor M is located at the entrance of a building or at the entrance to an office area.

In some embodiments, there is a communication device MG1, MG2 (e.g. mobile communication device, smart phone, laptop, tablet computer) configured for determining the current noise level of a location in a building by an appropriate sensor (e.g. Microphone, Phonometer, Sound Level Meter, Noise Dosimeter); wherein the communication device MG1, MG2 is further configured to communicate the noise level information and the location data to a computer system S. In some embodiments, the communication device MG1, MG2 (e.g. mobile communication device, smart phone, laptop, tablet computer, PDA-computer) is further configured to illustrate the noise heat map NHM (see FIG. 3) of the building B on the display of the communication device MG1, MG2, wherein the communication device MG1, MG2 in configured to receive the noise heat map from the computer system S. In some embodiments, the communication device MG1, MG2 (e.g. mobile communication device, smart phone, laptop, tablet computer) is further configured (e.g. via an App or software program which can be downloaded from the Internet) to receive the current noise heat map NHM (see FIG. 3) from the computer system S on demand of a user P1, P2.

In some embodiments, the computer system S comprises a cloud computing system.

Figure 5:
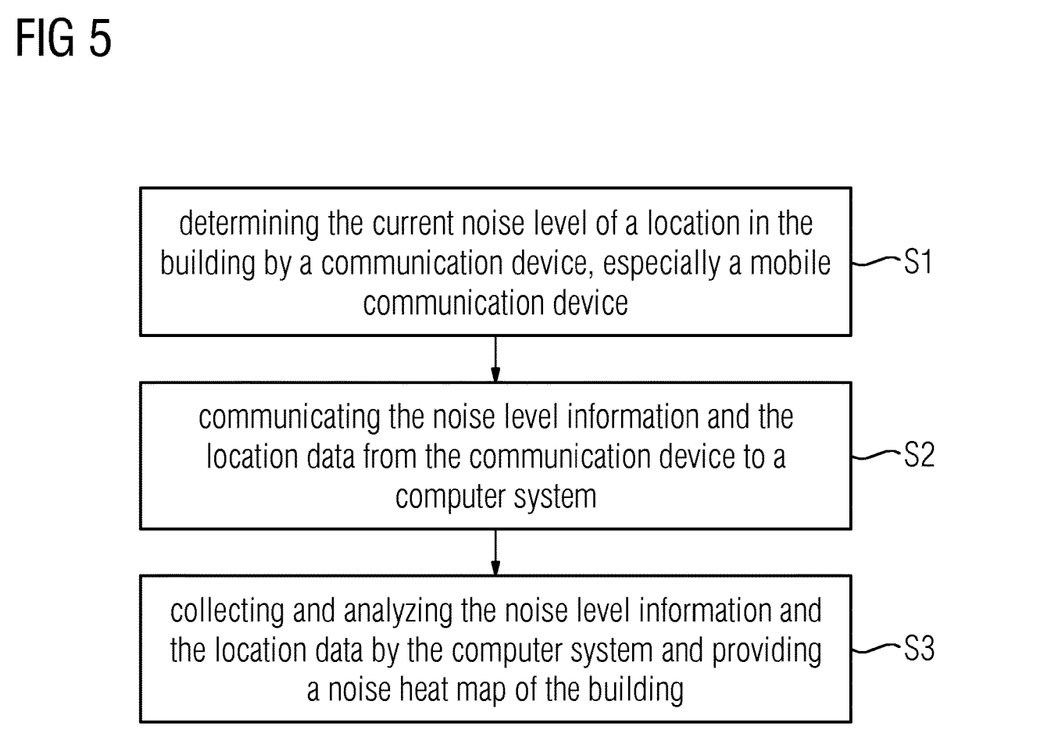
FIG. 5 illustrates an exemplary method for noise mapping in buildings.

FIG. 5 illustrates an exemplary method for noise mapping in one or more buildings. The method for noise mapping in one or more buildings comprises: (S1) determining (e.g. measuring by a sound level meter) the current noise level of a location in the building by a communication device (e.g. mobile communication device, smart phone, surveillance camera, notebook); (S2) communicating (e.g. via wireless radio connection) the noise level information and the location data from the communication device to a computer system; and (S3) collecting and analyzing the noise level information and the location data by the computer system and providing a noise heat map of the building. The computer system comprises adequate software and hardware (e.g. processor, memory, communication mechanisms).

The method can be realized with commercial off the shelf hardware and/or software components. For instance, noise mapping software is available as open source software. A noise heat map of a building or of a part of a building (e.g. a floor) can be generated by using e.g. adequate modeling or simulation techniques. Also noise mapping software (e.g. CadnaA, SoundPLAN, Code Tympan) can be used for noise pollution modeling to generate or to provide a noise heat map. Locations of communication devices can be determined by positioning systems, e.g. satellite-based positioning systems (e.g. GPS) or indoor positioning systems (IPS, e.g. BLE or WLAN).

In some embodiments, the noise heat map of the building is, especially permanently or continuously, updated by the computer system based on the received noise level information. In some embodiments, the noise heat map of the building is illustrated on a display at or within the building (e.g. at the entrance, in the lobby, or entry area of the building). In some embodiments, the noise heat map of the building is illustrated on the display of the communication device (e.g. mobile communication device). In some embodiments, the noise heat map of the building is illustrated on the display of the communication device (e.g. mobile communication device) on demand of a user.

In some embodiments, the presentation of the noise heat map of the building is automatically updated on the display of the communication device (e.g. mobile communication device). In some embodiments, based on the noise heat map and based on noise comfort parameters for users, a space allocation for a respective user is automatically performed.

The method or the system for noise mapping can be used for one building, for more buildings, or for a part of a building (e.g. a floor). In principle the invention (method and/or system for noise mapping in one or more buildings) can also be realized by voice services like Alexa and/or Echo (Amazon) or existing conferencing equipment.

Any steps of a method according to the present disclosure may be embodied in hardware, in a software module executed by a processor, in a cloud computing arrangement, or in a combination thereof. The software may include a firmware, a hardware driver run in the operating system, or an application program. Thus, the disclosure also relates to a computer program product for performing the operations presented herein. If implemented in software, the functions described may be stored as one or more instructions on a computer-readable medium. Some examples of storage media that may be used include random access memory (RAM), read only memory (ROM), flash memory, EPROM memory, EEPROM memory, registers, a hard disk, a removable disk, other optical disks, or any available media that can be accessed by a computer or any other IT equipment and appliance.

It should be understood that the foregoing relates only to certain embodiments of the disclosure and that numerous changes may be made therein without departing the scope of the disclosure as defined by the claims. It should also be understood that the disclosure is not restricted to the illustrated embodiments and that various modifications may be made within the scope of the claims.

REFERENCE SIGNS

S1-S3 Step
WA1-WA8 Location
B Building
OP Office Plan
M Monitor
P1, P2 Person
MG1, MG2 Communication Device
CC1-CC4 Communication Connection
IPS Positioning System
S Server
DB Database
C Cloud
NHM Noise Heat Map
NL Noise Level
S-App Sound App
CCTV Closed-Circuit television

What is claimed is:

1. A method for noise mapping in a building, the building including a plurality of defined locations, the method comprising:
    determining information associated with a respective current noise level of a first location in the building using a communication device;
    identifying a source of at least one noise contributing to the respective current noise level using a closed-circuit television system connected to a computer system;
    communicating the current noise level information and associated location data from the communication device to the computer system;
    collecting and analyzing the current noise level information and the location data using the computer system; and
    displaying a noise heat map of the building on the communication device.

2. The method according claim 1, further comprising updating the noise heat map using the computer system based on additional received noise level information.

3. The method according to claim 1, further comprising illustrating the noise heat map on a display.

4. The method according claim 1, wherein the noise heat map is illustrated on the display of the communication device in response to a demand from a user.

5. The method according claim 1, further comprising automatically updating the noise heat map on the display of the communication device.

6. The method according to claim 1, further comprising allocating a space based on the noise heat map and noise comfort parameters for particular users.

7. A system for noise mapping in a building, the building including a plurality of defined locations, the system comprising:
    a communication device configured to measure a respective current noise level of a first location in the building using an appropriate sensor of the communication device;
    wherein the communication device communicates the current noise level and associated location data to a computer system;
    a closed-circuit television system connected to the computer system used to identify a source of at least one noise contributing to the respective current noise level; and
    a computer system for collecting and analyzing the current noise level information and the corresponding location data;
    wherein the computer system provides a noise heat map of the building for display by the communication device.

8. The system according to claim 7, wherein the computer system comprises a cloud infrastructure.

9. The system according to claim 7, wherein the noise heat map is updated by the computer system based on additional received noise level information.

10. The system according to claim 7, wherein the noise heat map is illustrated on a display of the communication device in response to a demand from a user.

11. The system according to claim 7, wherein the noise heat map is automatically updated on a display of the communication device.

12. The system according to claim 7, wherein the noise heat map is automatically updated any time the computer system receives a new noise level information.

13. The system according to claim 7, wherein the noise heat map is automatically updated according to a defined time frame.

* * * * *